US008432854B2

(12) United States Patent
Cordeiro et al.

(10) Patent No.: US 8,432,854 B2
(45) Date of Patent: Apr. 30, 2013

(54) METHOD AND SYSTEM OF BEACON TRANSMISSION AND RECEPTION

(75) Inventors: Carlos Cordeiro, Ossining, NY (US); Monisha Ghosh, Chappaqua, NY (US); Vasanth R. Gaddam, Tarrytown, NY (US); Kiran S. Challapali, New City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1110 days.

(21) Appl. No.: 12/377,642

(22) PCT Filed: Jul. 12, 2007

(86) PCT No.: PCT/IB2007/052796
§ 371 (c)(1),
(2), (4) Date: Feb. 16, 2009

(87) PCT Pub. No.: WO2008/010168
PCT Pub. Date: Jan. 24, 2008

(65) Prior Publication Data
US 2010/0067428 A1 Mar. 18, 2010

Related U.S. Application Data

(60) Provisional application No. 60/807,347, filed on Jul. 14, 2006.

(51) Int. Cl.
*H04W 4/00* (2009.01)
(52) U.S. Cl.
USPC .......................................... 370/328; 370/338
(58) Field of Classification Search .......... 370/310–350, 370/500
See application file for complete search history.

(56) References Cited

U.S. PATENT DOCUMENTS

| 5,412,658 | A | 5/1995 | Arnold | |
|---|---|---|---|---|
| 5,475,866 | A | 12/1995 | Ruthenberg | |
| 8,064,405 | B2 * | 11/2011 | Parekh et al. | 370/332 |
| 2003/0012166 | A1 | 1/2003 | Benveniste | |
| 2003/0224787 | A1 * | 12/2003 | Gandolfo | 455/434 |
| 2004/0022219 | A1 * | 2/2004 | Mangold et al. | 370/336 |
| 2004/0223477 | A1 * | 11/2004 | Iwasaki et al. | 370/338 |
| 2006/0029073 | A1 * | 2/2006 | Cervello et al. | 370/389 |
| 2006/0041676 | A1 * | 2/2006 | Sherman | 709/231 |
| 2006/0083216 | A1 * | 4/2006 | Kwack | 370/351 |
| 2011/0026508 | A1 * | 2/2011 | Sakoda | 370/338 |

FOREIGN PATENT DOCUMENTS
EP 1650902 A1 4/2006

* cited by examiner

Primary Examiner — Warner Wong
(74) Attorney, Agent, or Firm — Larry Liberchuk

(57) ABSTRACT

A system includes a first primary wireless system (120) that communicates over a first range, and a first beaconing device (130) associated with the first primary wireless system (120). The first beaconing device (130) communicates over at least at a second range, wherein the second range is greater than the first range. The first beaconing device listens for beacons (510) from other beaconing devices (130) associated with other primary wireless systems (120) on a plurality of channels over which the other primary systems may operate. After listening for beacons from the other beaconing devices (130) associated with other primary wireless systems, the first beaconing device transmits a first beacon (510) to a wireless device (114) of a secondary wireless system (110) that may communicate over the second range. The first beacon includes data indicating an occupation of a first one of the channels by the first primary wireless system (120).

20 Claims, 9 Drawing Sheets

METHOD AND SYSTEM OF BEACON TRANSMISSION AND RECEPTION

CROSS-REFERENCES TO RELATED APPLICATIONS

This patent application claims the priority benefit under 35 U.S.C. §119(e) of U.S. Provisional Patent Application 60/807,347, filed on 14 Jul. 2006, the entirety of which is hereby incorporated by reference as if fully set forth herein.

This invention pertains to wireless communication devices and methods, and more particularly, to a method and system of beacon transmission and reception for wireless devices.

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANs), stationary computers in wireless networks, portable handsets, to name only a few).

As wireless applications continue to grow, so do the numbers of devices, networks and systems vying for the communications spectrum. As is known, there are dedicated or licensed portions as well as unlicensed portions of the communications spectrum. Because the unlicensed bands of the spectrum (e.g., the industrial, scientific and medical (ISM) radio bands) may be accessed freely, these bands tend to be heavily populated by users. Contrastingly, recent studies indicate that only a small portion of the licensed band is being efficiently used. Thus, much of the unlicensed band is overcrowded, while a relatively large portion of the licensed band is allocated but unused. This had lead regulatory bodies (e.g., the Federal Communications Commission (FCC) of the U.S.) to an evaluation of current communication band allocations and their use.

One option for reallocation of the communications band involves the use of wireless networks adapted to dynamically access the communications spectrum. For example, dynamic spectrum access (DSA) wireless networks may be implemented in dedicated (licensed) portions of the communications spectrum. Illustratively, DSA wireless networks may operate in a spectrum normally dedicated for television transmission and reception. Thereby, certain portions of the communications band may be more fully utilized.

With the reallocation of certain communication bands for use by unlicensed (secondary) users, spectrum management is needed to ensure that licensed (primary or incumbent) users with priority access to the band are provided this access in an unfettered manner. For example, regulatory bodies (e.g., the FCC) may require that a secondary user vacate a channel in a relatively short period of time after an incumbent user begins occupation of the channel. Therefore, the medium access control (MAC) layer and physical (PHY) layer specifications must include provisions directed to this needed spectrum management.

As can be appreciated, in order for a secondary wireless device or system to vacate a channel when an incumbent device or system begins occupying the channel, the secondary wireless device or system must determine the need to vacate the channel. Some primary wireless systems (e.g., broadcast television transmitters) may transmit at comparatively high power levels and/or from tall towers and thus their signals propagate over comparatively long ranges. For example, a primary wireless system may transmit at power levels on the order of kilowatts (kW) from a tower that is several hundred feet above the local average terrain, and so the signal may effectively propagate over a range of, for example, 100 km. By contrast, secondary wireless systems may transmit at power levels of tens or hundreds of milliwatts (mW) and thus over a range of, for example, only 1 km. In such a scenario, because of the comparatively large range of transmission by the primary wireless system, secondary users are readily able to sense the presence of a primary wireless system(s) and vacate channels as needed.

However, other primary wireless systems (e.g., wireless microphone systems such as those operating under FCC Part 74 rules) may transmit at a comparatively lower power level and over shorter ranges than a secondary wireless system (e.g., a wireless regional area network (WRAN), wireless metropolitan area network (WMAN) or WLAN). In this case, the detection of primary wireless systems by a secondary wireless system can be problematic. For instance, because the communication range of such a primary wireless system is comparatively small, there may be no secondary wireless systems in range for detection of the primary wireless system. However, because in this case the secondary wireless system transmits at a higher power level and therefore can transmit over a much greater range, the secondary wireless system may be transmitting interfering signals in the primary wireless system's channel, without knowledge of the presence of the primary wireless system.

To address such situations, a low-power primary wireless system (e.g., wireless microphone systems) may be provided with an associated beacon transmitter to periodically transmit a beacon signal that may be received over a greater communication range than the operating range of the primary wireless system with which it is associated. In one case, the beacon transmitter may be adapted to communicate over a communication range that is at least as great as the communication range of a secondary wireless system which searches for the presence of any primary wireless systems (alternatively, the beacon transmitter may transmit over a range that is greater than the range of the primary wireless system, but which is smaller than the range of the secondary wireless system, depending upon the protection contour to be provided for the primary wireless system). The beacon signal indicates the presence of a primary wireless system operating on a channel (or channels) which must be protected by the secondary wireless system. In this way, the secondary wireless system (e.g., a WRAN/WMAN/WLAN) may receive the beacon signal, detect the presence of the associated primary wireless system operating on a channel (or channels), and avoid interfering with the primary wireless system's operation on the channel(s).

However, the addition of such beacon transmitters presents other challenges. Situations may occur where a number of different primary wireless systems are co-located, or operate in a vicinity of each other. For example, such situations may occur at sporting events, political conventions, or other venues where many different television stations may be conducting live remote reports or broadcasts which use a number of different wireless microphone systems. In that case, the beacon signals may collide with each other, or otherwise interfere with each other so as to prevent their reception by a secondary wireless system. Also, it is inefficient (e.g., spectrally) for each of the beaconing devices to separately transmit its own beacon information without regard to information of neighboring beaconing devices.

Accordingly, it would be desirable to provide an improved system and method that can inform a secondary wireless system of the presence of a primary wireless system that operates at a lower power level.

In one aspect of the invention, a system comprises: a first primary wireless system adapted to communicate over a first range; and a first beaconing device associated with the first primary wireless system which is adapted to communicate over at least at a second range, wherein the second range is greater than the first range. The first beaconing device is adapted to listen for beacons from other beaconing devices associated with other primary wireless systems on a plurality of channels over which the other primary systems may operate. After listening for beacons from the other beaconing devices associated with other primary wireless systems, the first beaconing device is adapted to transmit a first beacon to a wireless device of a secondary wireless system. The first beacon includes data indicating an occupation of a first one of the channels by the first primary wireless system. In one embodiment, the secondary wireless system communicates over the second range.

In another aspect of the invention, a method of wireless communication is provided. The method comprises: providing a first beaconing device associated with a first primary wireless system that is adapted to communicate over a first range, the first beaconing device being adapted to communicate over at least at a second range, wherein the second range is greater than the first range, listening for beacons from other beaconing devices associated with other primary wireless systems on a plurality of channels over which the other primary systems may operate; and after listening for beacons from the other beaconing devices associated with other primary wireless systems, transmitting a first beacon to a wireless device of a secondary wireless system, wherein the first beacon includes data indicating an occupation of a first one of the channels by the first primary wireless system. In one embodiment, the secondary wireless system communicates over the second range.

DETAILED DESCRIPTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

It is noted that in the illustrative embodiments described herein, a secondary wireless system may be a wireless network with a centralized architecture or a decentralized architecture. Illustratively, the secondary wireless system may be one which functions under a DSA Medium Access (MAC) layer, such as to be defined under IEEE 802.22, or as defined under the ECMA 368 standard, IEEE 802.16, IEEE 802.11, or IEEE 802.15. The disclosures of the specifications of the referenced IEEE or EDMA standards are specifically incorporated herein by reference in their entirety.

Moreover, the secondary wireless system may be a cellular network; a wireless local area network (WLAN); a wireless personal area network (WPAN); or a wireless regional area network (WRAN). Furthermore, the MAC protocol may be a time division multiple access (TDMA) protocol; a carrier sense multiple access (CSMA) protocol; a CSMA with collision avoidance (CSMA/CA) protocol; a Code Division Multiple Access (CDMA) protocol; or a frequency division multiple access (FDMA) protocol. It is emphasized that the noted networks and protocols are merely illustrative and that networks and protocols other than those specifically mentioned may be used without departing from the present teachings.

Figure 1:
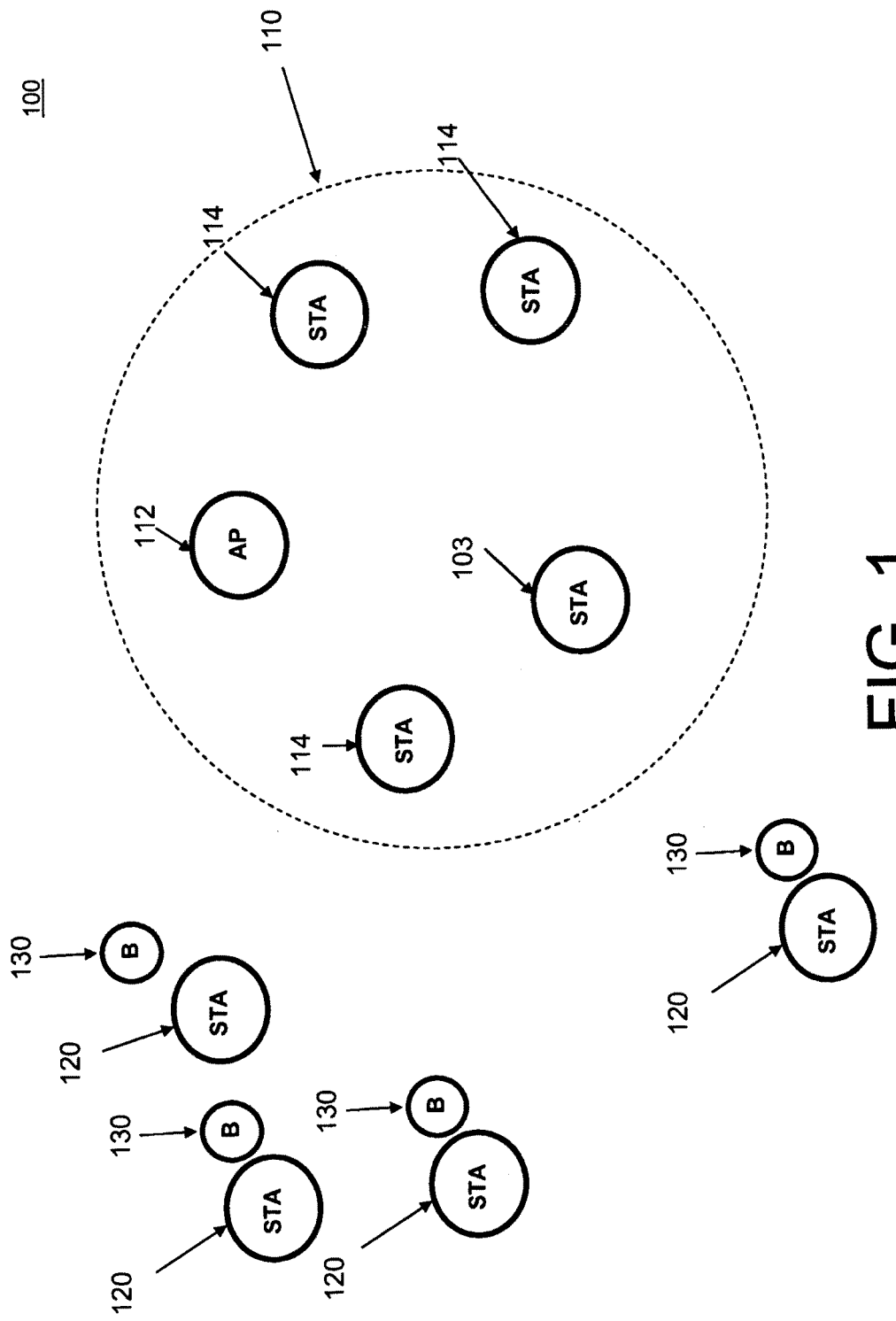
FIG. 1 illustrates one exemplary embodiment of a system.

FIG. 1 illustrates one exemplary embodiment of a system 100. System 100 includes a secondary wireless system 110, a plurality of primary wireless systems 120, and a plurality of beaconing devices 130 each associated with one or more of the primary wireless systems 120.

Secondary wireless system 110 may comprise a centralized network and include an access point (AP) 112, which also may be referred to as a base station (BS). Secondary wireless system 110 further comprises a plurality of wireless devices 114, which also may be referred to as wireless stations (STAs) or Customer Premise Equipment (CPE). Notably, the present teachings may be generalized to distributed wireless networks. For example, AP 112 of secondary network 110 or may be linked to one or more other APs (not shown) of one or more other secondary networks. As such, in certain embodiments, APs 112 may transmit beacons.

In one embodiment, primary wireless systems 120 each comprise a wireless microphone system, including one or more wireless microphone transmitters and one or more wireless microphone receivers.

Beneficially, beaconing devices 130 are each associated with one or more primary wireless systems 120. Beneficially, a beaconing device 130 may be collated with an associated primary wireless system 120. In that case, beaconing device 130 may be incorporated into equipment for primary wireless system 120, or it may be a standalone unit.

In representative embodiments, primary wireless systems 120 transmit and/or receive over a first communication range; and secondary wireless system 110 transmits and/or receives over a communication range which is greater than the first communication range. In that case, beaconing devices 130 are adapted to transmit beacons that can be received by secondary wireless system 110 (e.g., by wireless device 114). In representative embodiments, beaconing devices 130 are adapted to transmit and/or receive over a communication range over a range that is greater than the range of the primary wireless system. In on embodiment, beaconing devices 130 are adapted to transmit and/or receive over a communication range that can be greater than the communication range of secondary wireless system 110. As will be appreciated, this improves the likelihood that secondary wireless system 110 is made aware of the presence of primary wireless system(s) 120 and the channel(s) which it/they occupies. Finally, the noted ranges are generally indicative of the power transmitted by the wireless systems, with primary wireless systems 120 operating at a lower power level compared to secondary wireless system 110 and beaconing devices 130.

Illustratively, system 100 may comprise one of the types of networks noted previously. Moreover, secondary wireless system 110 may include computers, mobile telephones, personal digital assistants (PDAs), or similar wireless devices 114 that typically operate in such networks. In a specific embodiment, it is contemplated that the secondary wireless system 110 is adapted to function in restricted frequency channels of a frequency band that requires protection of incumbent users, such as primary wireless systems 120. Often, for simplicity restricted frequency channels and restricted channels may be referred to as "channels."

It is noted that only a few primary and secondary wireless systems 120 and 110 are shown; this is merely for simplicity of discussion. Clearly, many other primary and secondary wireless systems 120 and 110 may exist. Moreover, it is noted that primary and secondary wireless systems 120 and 110 are not necessarily the same. In fact, a plethora of different types of both primary and secondary wireless systems 120 and 110 may be used within the networks of the system 100.

In one embodiment, beaconing devices 130 are adapted to function according to the protocol of secondary wireless system 110. For example, in certain applications, secondary wireless system 110 functions according to the 802.22 protocol referenced above. Accordingly, beaconing devices 130 are either adapted to function according to this protocol or can be understood by devices using this protocol. In such embodiments, beaconing devices 130 may communicate with one or more wireless devices of secondary wireless system 110. However, it is not essential that the beaconing devices 130 function according to the protocol of secondary wireless system 110. Rather, beaconing devices 130 may merely transmit beacons for reception by secondary wireless system 110.

As shown in FIG. 1, a plurality of beaconing devices 130 may be located in vicinity to each other. To ameliorate a problem of collision or other interference between beacons, in one exemplary embodiment, beaconing devices 130 may operate according to one or more aspects of a protocol as set forth below.

Beneficially, beaconing devices 130 are able to communicate with each other; each transmitting their own beacons, and listening to beacons from other beaconing devices 130. Accordingly, beaconing devices 130 may comprise a beaconing network. In that case, beaconing devices 130 may become organized into parent device(s), child device(s), etc., with a hierarchy.

In one embodiment, beaconing devices 130 communicates within a communication structure that includes a repeating communication pattern such as superframes.

Beneficially, a beaconing device 130 has the capability to perform a channel energy detection, for detecting the presence of another primary wireless system 120, and a beacon detection for detecting beacons transmitted by other beaconing devices 130. This allows beaconing device 130 to build a channel map which identifies channels occupied by secondary wireless systems 110 (e.g., WRANs) and/or other high power transmitters (e.g., TV transmitters), and channels occupied by other primary wireless systems 120 (e.g., wireless microphone systems). This may require more than one measurement per TV channel with associated timings requirement (e.g., about 3 ms per TV channel to detect a WRAN).

Figure 2:
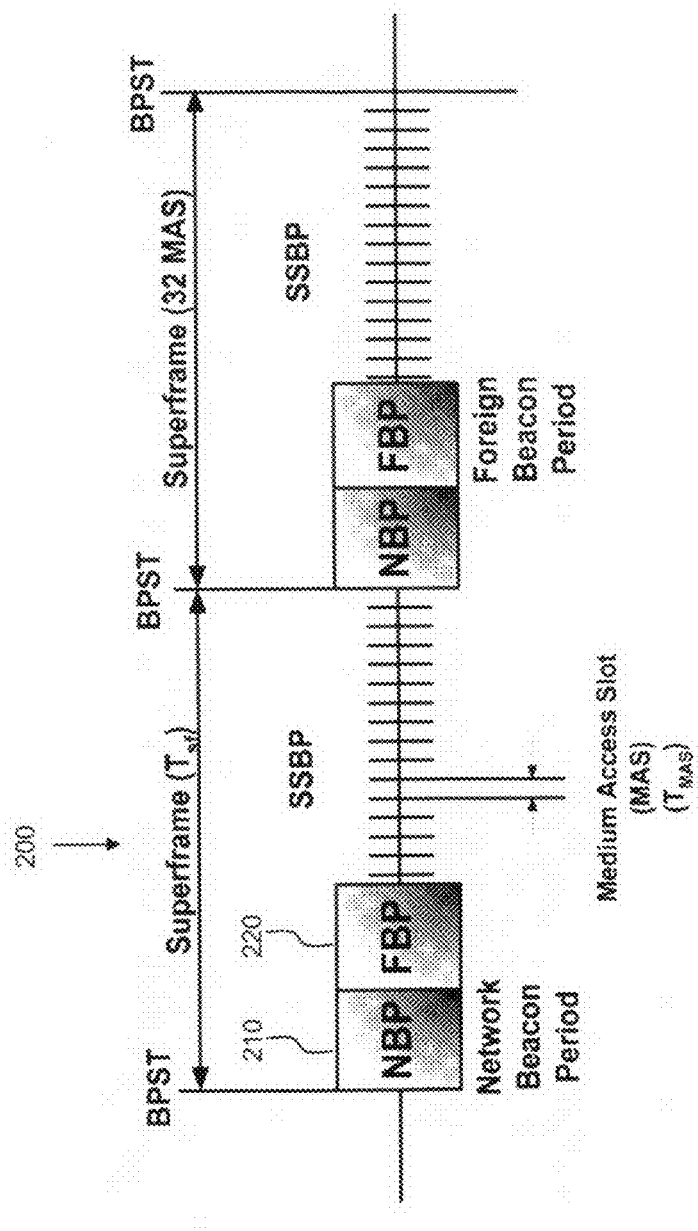
FIG. 2 illustrates one exemplary embodiment of a superframe.

FIG. 2 illustrates one exemplary embodiment of a superframe 200 by which a beaconing device 130 may communicate. Superframe 200 includes a "network" beacon period (NBP) 210, a "foreign" beacon period (FBR) 220, and a Sense/Sleep period 230. As used herein, the term "network" beacon period 210 corresponds to a time period within superframe 200 during which beaconing devices 130 within a close vicinity of each other, or arranged in a "beacon network," may transmit their beacons. Also as used herein, the term "foreign" beacon period 220 corresponds to a time period within superframe 200 during beacons may be transmitted from a secondary wireless system 110, and/or by beaconing devices associated one or more distantly located primary wireless systems. It should be understood that superframe 200 is not drawn to scale and, in some embodiment, NBP 210 and FBP 220 comprise a very small portion of the entire superframe 200. In another embodiment, superframe 200 may comprise solely and entirely NBP 210 and, in this case, not include any FBP 220.

It should be appreciated that NBP 210 provides a fully distributed and autonomous mechanism for coordination of beaconing devices 130, and better spectrum use by both primary wireless systems 120 and secondary wireless systems 110. Beneficially, in this way beacon coordination does not rely on a central coordinator, which is a point of failure and hence could compromise incumbent protection. Also, the Sense/Sleep Period 230 may be used by beaconing devices 130 for sensing channels, sleeping, or for out-of-band beaconing.

Figure 3:
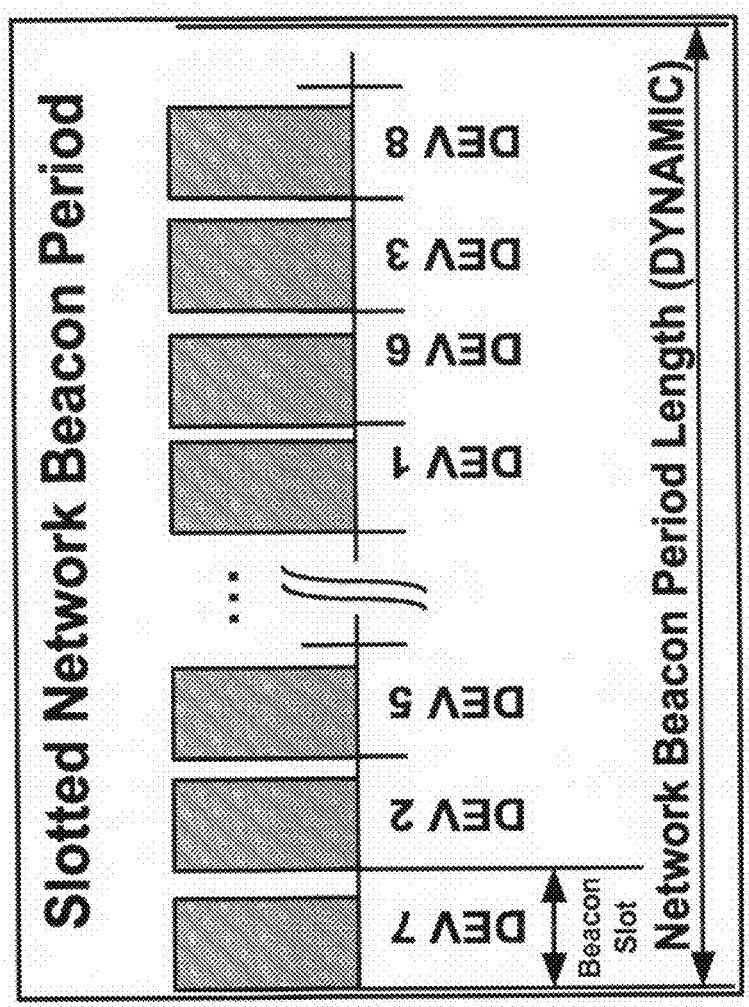
FIG. 3 illustrates one exemplary embodiment of a beacon period for transmission of beacons by beaconing device(s) associated with one or more primary wireless systems within a close vicinity of each other, or arranged in a "beacon network."

FIG. 3 illustrates one exemplary embodiment of a NBP 210 for transmission of beacons by beaconing device(s) 130 associated with one or more primary wireless systems 120 within a close vicinity of each other, or arranged in a "beacon network." NBP 210 comprises a plurality of beacon slots 300, each of which may be occupied by a beacon transmitted by a beaconing device 130. As explained in greater detail before, a beacon transmitted by a beaconing device 130 within NBP 210 may include: a Device Address (DevAddr); a length of NBP 210 and FBP 220 within superframe 200; a Beacon Channel and Sub-Channel Number occupied by a primary wireless system 120; a Beacon Slot Number; a List of Neighboring primary wireless systems 120; a list of TV channels occupied by primary wireless systems 120; a received signal strength indication (RSSI); a start time and duration of occupation of a channel by Location Information of a primary wireless system 120; an Authentication Key; user specific information; etc.

Figure 4:
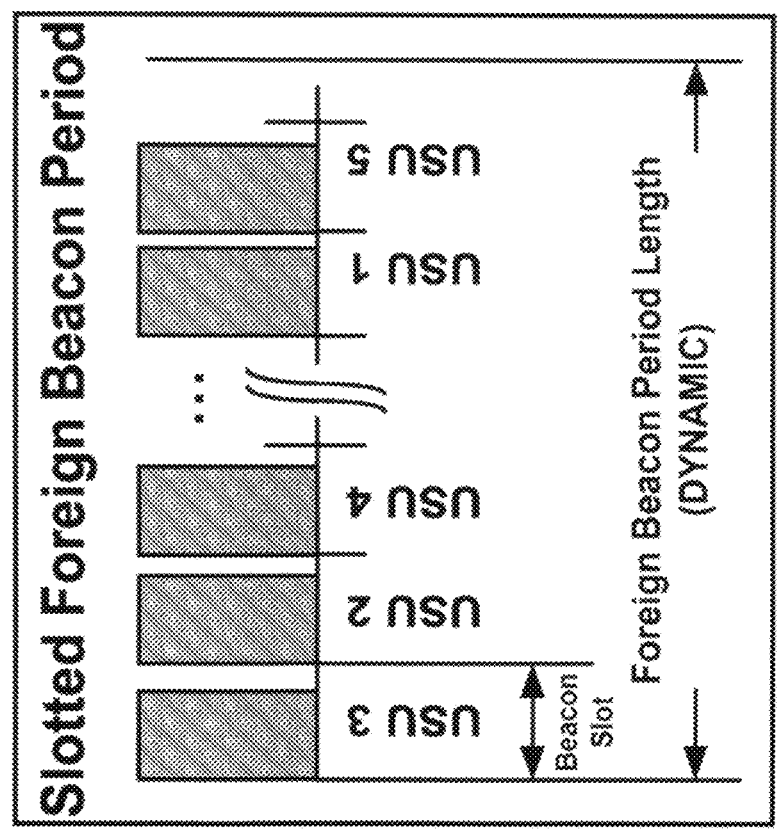
FIG. 4 illustrates one exemplary embodiment of a beacon period for transmission of beacons by a beaconing device associated with a secondary wireless system, and/or by beaconing devices associated one or more distantly located primary wireless systems.

FIG. 4 illustrates one exemplary embodiment of a FBP 220 for transmission of beacons by a beaconing device associated with a secondary wireless system 110, and/or by beaconing devices associated one or more distantly located primary wireless systems. FBP 210 comprises a plurality of beacon slots 400, each of which may be occupied by a beacon transmitted by a secondary wireless system 110, or a distantly located beaconing device 130. As explained in greater detail before, a beacon transmitted by within FBP 220 may include: a base station (BS) ID; info on authentication of a primary wireless system 120; Spectrum Occupancy (e.g., occupied, vacant, etc.); a prioritized channel list suggested for use by primary wireless systems 120; a quiet period; a list of TV channels occupied by primary wireless systems 120, an RSSI, a start time and duration of occupation of a channel; location information; etc.

Figure 5:
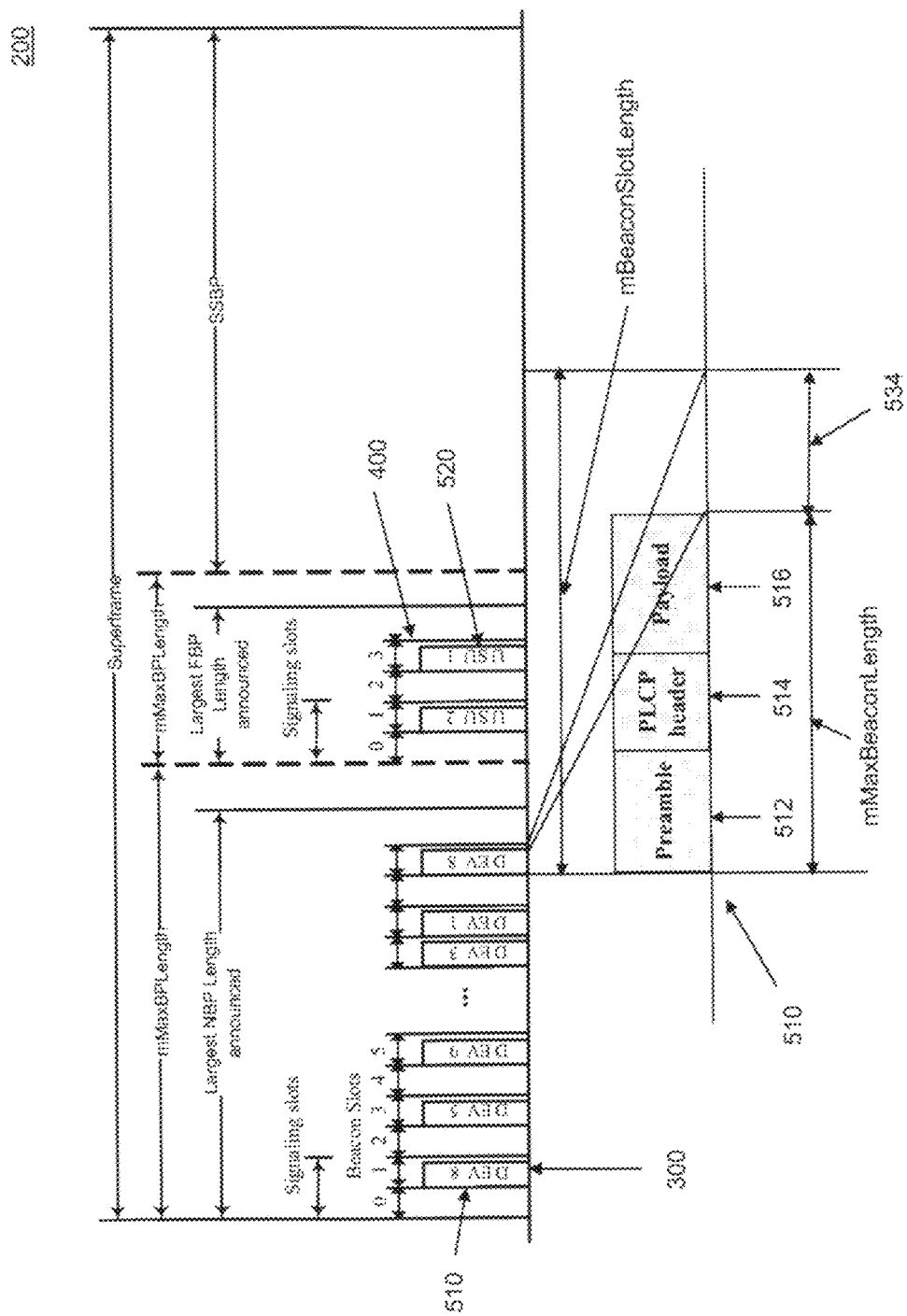
FIG. 5 illustrates a more detailed view of one exemplary embodiment of the superframe of FIG. 2.

FIG. 5 illustrates a more detailed view of one exemplary embodiment of the superframe 200 of FIG. 2. As can be seen in FIG. 5, each NBP 210 includes a plurality of beacon slots 300, some or all of which are occupied by beacons 510 from a beaconing device 130. Each beacon 510 includes a preamble 512, a header 514, and a beacon payload 516. Also FBP 210 includes a plurality of beacon slots 400, each of which may be occupied by a beacon 520 transmitted by a secondary wireless system 110, or a distantly located beaconing device 130.

As illustrated in FIG. 5, the lengths of NBP 210 and FBP 220 are variable up to a corresponding maximum beacon period length. Also, each beacon slot 300 and 400 comprises a corresponding beacon length 532 and guard time 534.

Figure 6:
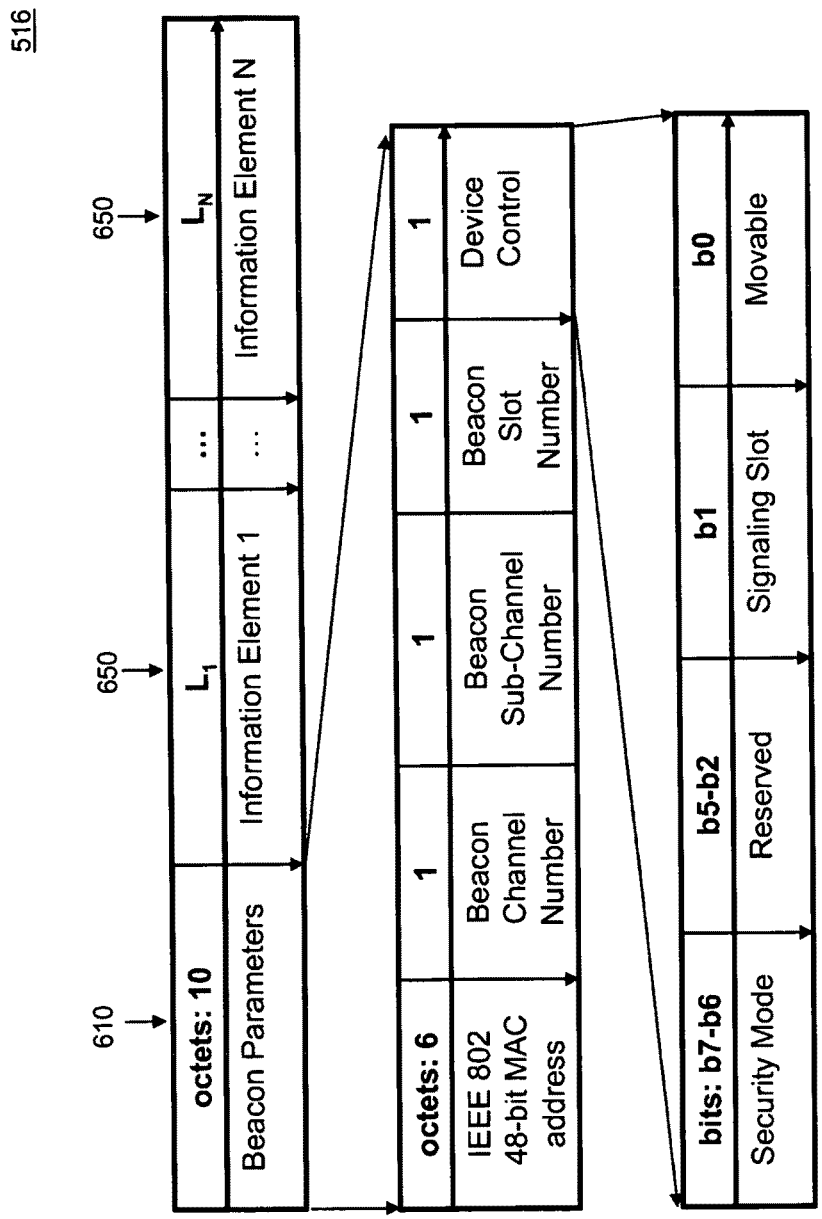
FIG. 6 illustrates one exemplary embodiment of a beacon frame payload.

FIG. 6 illustrates one exemplary embodiment of a beacon payload 516. Beacon payload 516 includes one or more beacon parameters 610 and one or more information elements 650.

Beneficially, beacon parameters 610 identify parameters of the beacon. Exemplary beacon parameters 610 include a Device Identifier, a Beacon Channel Number, a Beacon Sub-Channel Number, a Beacon Slot Number, and Beaconing Device Control parameters, such as a Security Mode at which the device is operating, where the beacon slot 300 is a Signaling Slot, and whether beaconing device 130 can move the beacon 510 to another beacon slot 300.

Beneficially, beacon IEs 650 comprises beacon data transmitted by a beaconing device 130. Exemplary beacon IEs 650 include a Beacon Period Occupancy IE (BPOIE), a primary wireless system IE, a Hibernation Mode IE (for sleep periods), an IE indicating Channels to Sense, a Spectrum Occupancy IE, a Location IE, a Channel Change IE, a Beacon Period (BP) Switch IE, a Probe IE, a MAC Capabilities IE, an Operator/User/Application-specific IE.

Figure 7:
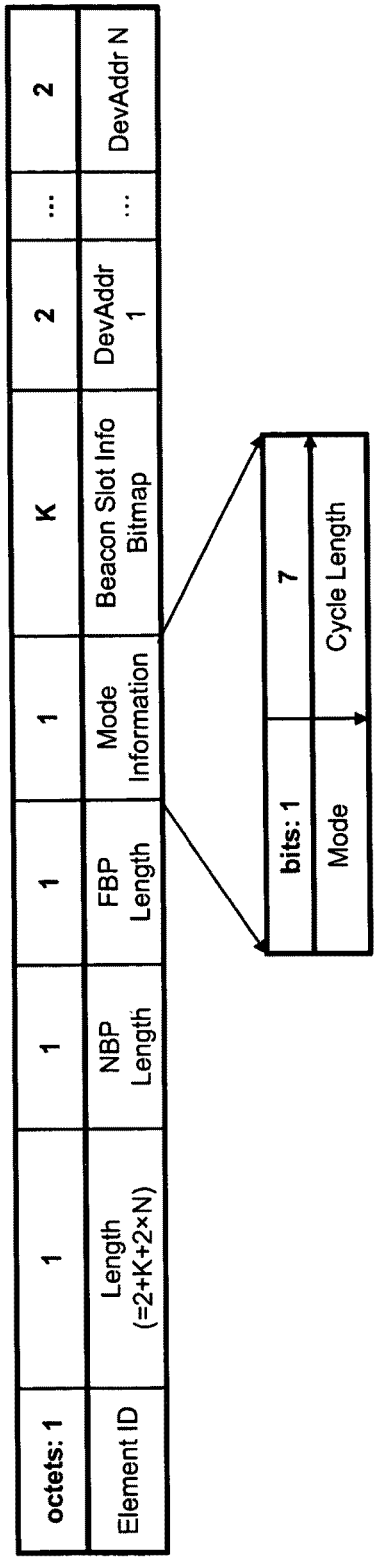
FIG. 7 illustrates one exemplary embodiment of a beacon period occupancy information element (IE).

FIG. 7 illustrates one exemplary embodiment of a beacon period occupancy information element (IE) 700. BPOIE 700 includes an NBP Length, a FBP Length, a Mode Information field, a field indicating whether BPOIE 700 is an "incremental dump" or "full dump" of beacon data, a Beacon Slot Info Bitmap, and a DevAddr list of corresponding Device Addresses for primary wireless systems 120 from which a beacon was received in the previous superframe, beneficially in ascending beacon slot order.

Beneficially, the Beacon Slot Info Bitmap includes a plurality of Beacon Period Slot Status fields based on what the transmitting beaconing device 130 heard in a previous beacon period 210, with a 1-to-1 with the DevAddr list.

Beneficially, the Beacon Period Slot Status (BPSS) field is a two-bit field. In one embodiment, when the BPPS field is 00, this indicates that the corresponding beacon slot 300 is unoccupied (non-movable). This is determined when no indication of that medium activity was received in the corresponding beacon slot 300 in the last superframe 200, or any frame header 514 received with a valid header check sequence (HCS) was not a beacon 510. In one embodiment, when the BPPS field is 01, this indicates that the corresponding beacon slot 300 is occupied & non-movable. This is determined when a beacon 510 was received with a valid HCS and frame check sequence (FCS) in the corresponding beacon slot 300 in the last superframe 200, and the movable bit in that beacon 510 was set to "zero," or when a beacon 510 was received in the corresponding beacon slot 300 in a previous superframe 200 that indicated a hibernation period that has not expired. In one embodiment, when the BPPS field is 10, this indicates that the corresponding beacon slot 300 is occupied & movable. This is determined when an indication of medium activity was received in the corresponding beacon slot 300 in the last superframe 200, but did not result in reception of a beacon 510 with valid HCS and FCS. In one embodiment, when the BPPS field is 11, this indicates that the corresponding beacon slot 300 is occupied & movable. This is determined when a beacon 510 was received with a valid HCS and FCS in the corresponding beacon slot 300 in the last superframe 200, and the movable bit in that beacon 510 was set to "one."

In the description above, a beacon slot 300 is considered to be "non-movable" when a beaconing device 130 finds at least one available beacon slot 300 between signaling slots and its own beacon, or when a beaconing device 130 includes a Hibernation Mode IE in its beacon, the beacon slot 300 is considered to be non-movable during the announced hibernation period.

Figure 8:
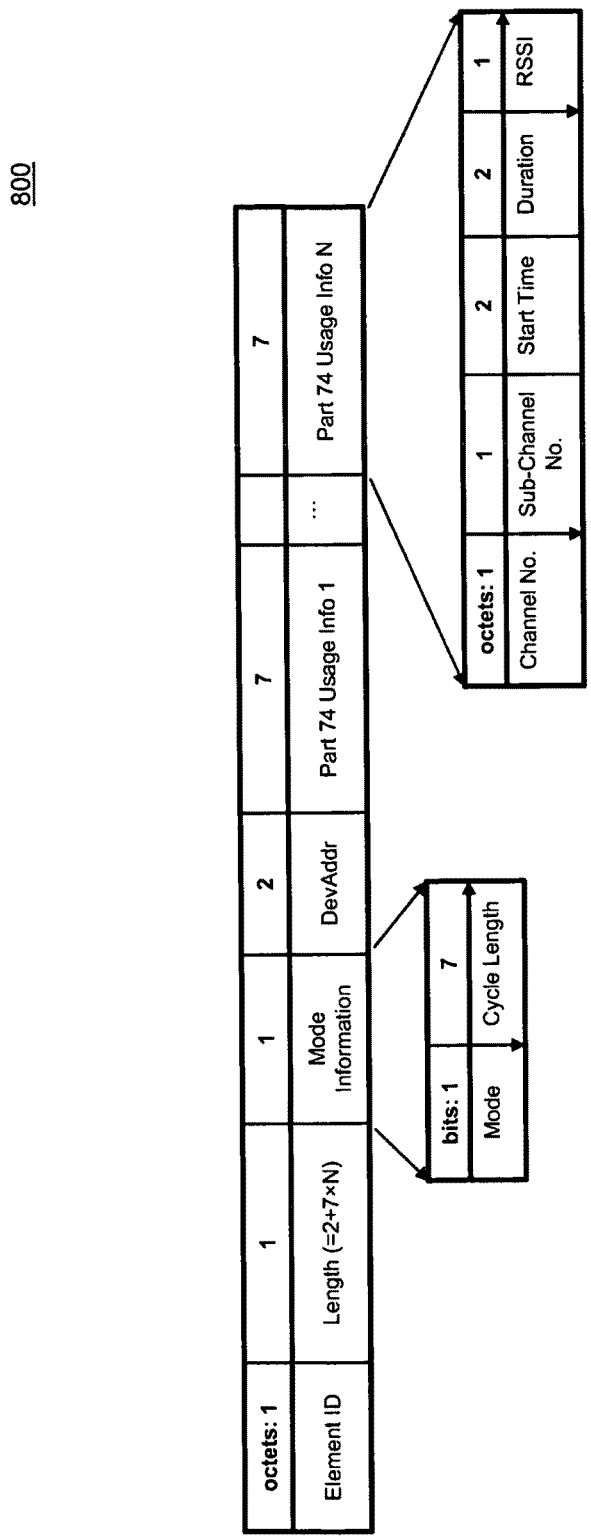
FIG. 8 illustrates one exemplary embodiment of a primary wireless system occupancy information element.

FIG. 8 illustrates one exemplary embodiment of a primary wireless system occupancy information element (PWSOIE) 800. PWSOIE 800 includes a Mode Information field, a field indicating whether PWSOIE 800 is an "incremental dump" or "full dump" of primary wireless system data, a DevAddr field identifying an address of a beaconing device 130 which made the report, a Channel Number, a Sub-Channel Number (if known), a start time when the corresponding primary wireless system 120 expects to be occupying the channel (if known), a duration during which the corresponding primary wireless system 120 expects to be occupying the channel (if known), an RSSI for the corresponding primary wireless system 120 (if known).

Operation of beaconing devices 130 within system 100 will now be described.

At power-up, beaconing device 130 first scans channels (e.g., TV channels), searching for beacons from other beaconing devices 130, beneficially listening for at least one full superframe period 200 per sub-channel to detect any other beacons 510 that may be present.

If no beacon 510 is received during the scan procedure, and if beaconing device 130 has a pre-programmed channel Ni (sub-channel i within (e.g., TV) channel N), or knows in which channel N its associated primary wireless system 120 will operate, then beaconing device 130 may set its own beacon period start time (BPST) and send the first beacon 510 in the first beacon slot 300 after the signaling slots, through channel Ni.

Meanwhile, if beaconing device 130 does not have a pre-programmed channel Ni and does not know in which channel N its associated primary wireless system 120 will operate, then it may select a vacant channel N, set its own BPST, and send the first beacon 510 in the first beacon slot 300 after the signaling slots, through channel Ni On the other hand, beaconing device 130 does receive another beacon 510 during the listening or scan period, then it looks for an empty beacon slot 300 within a predefined number X (e.g., X=8) of beacon slots 300 after the highest-numbered unavailable beacon slot 300, up to a predefined maximum length.

Within a particular channel, the sub-channel i where the beacon 510 is transmitted can be: determined dynamically (with a long search procedure and higher delay); or pre-assigned (allowing faster discovery by both other beaconing devices 130 and secondary wireless systems(s) 110.

Once a beacon slot 300 is chosen for a beaconing device 130, beneficially the beacon 510 is always sent in the same beacon slot 300 unless either a collision is detected, or contraction is required.

Beneficially, every beaconing device 130 sends at least one beacon 510 per beacon period 300. Moreover, beaconing devices 130 may transmit multiple beacons 510 in multiple beacon slots 300 within a beacon period 210, for example, in a case where there are free beacon slots 300, and there are few or no neighboring beaconing devices 130. This will facilitate detection by a secondary wireless systems 110.

Upon receiving a beacon 510, a beaconing device 130 processes it. Beneficially this includes determining the applicability of the received beacon data and updating its own beacon, if needed. For example if the receiving beaconing device 130 is "far enough away" (based on location information) from the beaconing device 130 that broadcast the beacon 510 reporting an incumbent user (e.g., primary wireless system 120), then there is no need to rebroadcast the PWSOIE information. Furthermore, beacon data shall not be rebroadcast for more than a selected number (e.g., Y) of hops.

Also beneficially, a beaconing device 130 rebroadcasts the relevant information obtained from its neighboring beaconing devices 130 after processing all received beacons 510.

Various two options are possible for a secondary wireless system 110 to detect a beacon transmitted by a beaconing device 130.

In one case, the out-of-band measurement capability of a secondary wireless system 110 is used to discover the beacon periods 300 of nearby beaconing devices 130.

In a first arrangement, secondary wireless system 110 knows a priori on which sub-channel i beaconing devices 130 beacon periods 300 operate. In that case, a timely out-of-band measurement capability detects the beaconing devices' 130 beacon periods 300 within a required channel detection time to prevent transmission on a channel occupied by a protected system (e.g., a primary wireless system 120).

In a second arrangement, beaconing devices 130 use pilot signals, with secondary wireless system 110 employing a pilot detection scheme.

Also, beaconing devices 130 may proactively operate on channels occupied by primary wireless systems 120 and transmit beacons 510 through those channels. This is also known as out-of-band beaconing. Through the beacon period 300, beaconing devices 130 dynamically negotiate who will transmit beacons 510 through which occupied channels. Beaconing devices 130 can take turn in beacon transmission and hence better mitigate fading and shadowing.

Figure 9:
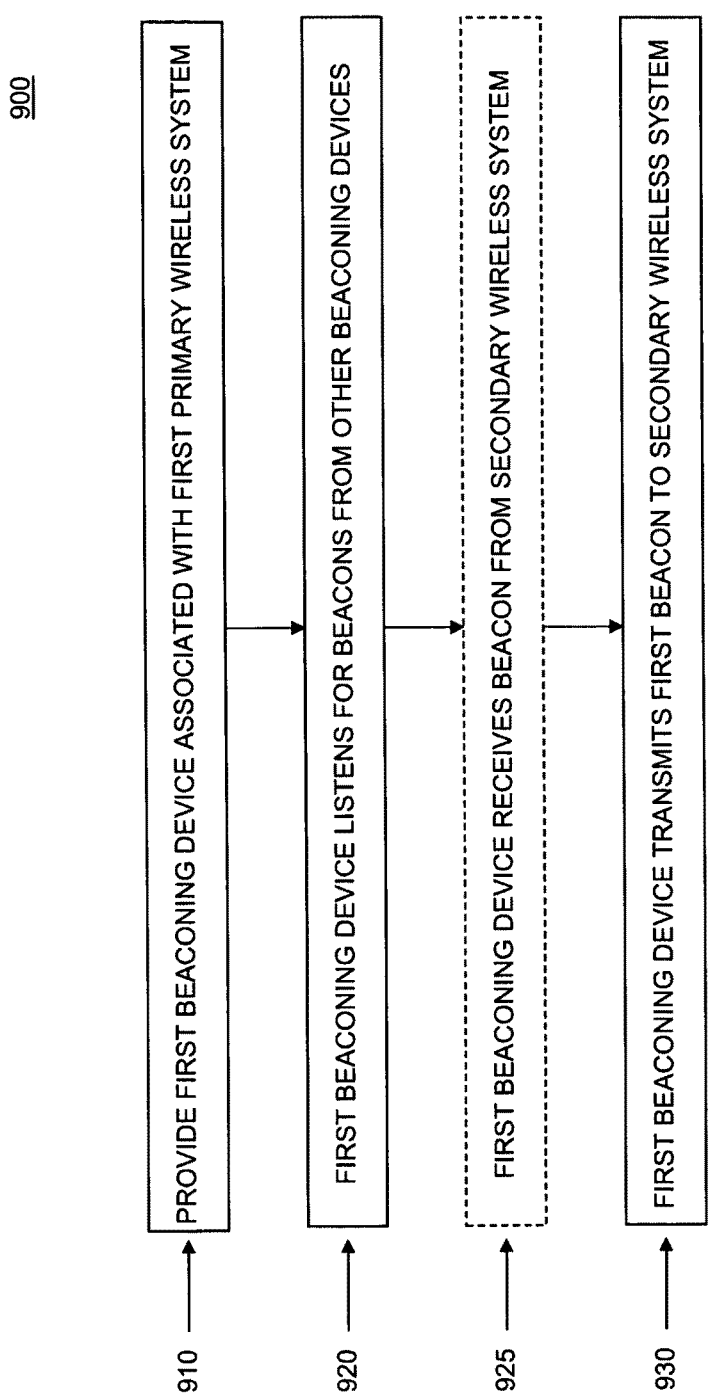
FIG. 9 is a flowchart illustrating one exemplary embodiment of a method of wireless communication.

FIG. 9 is a flowchart illustrating one exemplary embodiment of a method 900 of wireless communication.

In a step 910, a first beaconing device associated with a first primary wireless system that is adapted to communicate over a first range. The first beaconing device is adapted to communicate over at least at a second range, wherein the second range is greater than the first range.

Next, in a step 920, the first beaconing device listens for beacons from other beaconing devices associated with other primary wireless systems on a plurality of channels over which the other primary systems may operate.

Optionally, in a step 925 the first beaconing device may also receive a beacon from a secondary wireless system, or a beaconing device for another, distantly located, primary wireless system.

Then, in a step 930, after listening for beacons from the other beaconing devices associated with other primary wireless systems, the first beaconing device transmits a first beacon to a wireless device of a secondary wireless system that communicates over the second range. The first beacon includes data indicating an occupation of a first one of the channels by the first primary wireless system.

According to an arrangement as described above, one or more of the following benefits may be realized. A beaconing device can signal the presence of, and identify channels in use by, low power licensed devices (e.g., wireless microphone systems such as those operating under FCC Part 74 rules) associated with the beacon and operating in close proximity to the beacon. Spectrum usage by multiple beacons operating in close proximity to each other may be improved. Data from a plurality of low power licensed devices may be aggregated. The deleterious effects of transmission channel fading and distortion on beacons may be alleviated. Low power licensed devices may be able to coordinate their channel usage.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A system, comprising:
   a first primary wireless system adapted to communicate over a first range; and
   a first beaconing device associated with the first primary wireless system, and adapted to communicate over at least at a second range, wherein the second range is greater than the first range,
   wherein the first beaconing device is adapted to listen for beacons from other beaconing devices associated with other primary wireless systems on a plurality of channels over which the other primary systems may operate, and wherein, after listening for beacons from the other beaconing devices associated with other primary wireless systems, the first beaconing device is adapted to transmit a first beacon to a wireless device of a secondary wireless system,
   wherein the first beacon includes data indicating an occupation of a first one of the channels by the first primary wireless system, data indicating a power level of a signal transmitted by the first primary wireless system, and data indicating a location of the first primary wireless system.

2. The system of claim 1, wherein the secondary wireless system communicates over the second range.

3. The system of claim 1, wherein the first beacon further includes data indicating a time during which the first beacon further occupies the first channel.

4. The system of claim 1, wherein the first beacon further includes data indicating an occupation of a second one of the channels by a second primary wireless system (120).

5. The system of claim 4, wherein the first beacon further includes data indicating a power level of a signal transmitted by the second primary wireless system, and data indicating a location of one of the second primary wireless system.

6. The system of claim 1, wherein the first beaconing device is further adapted to communicate with a second beaconing device associated with the second primary wireless system.

7. The system of claim 1, wherein the first beaconing device is adapted to transmit the first beacon within the first channel.

8. The system of claim 1, wherein the first beaconing device is adapted to transmit the first beacon within a beacon slot in a beacon period of a superframe.

9. The system of claim 1, wherein the first beaconing device is adapted to transmit the first beacon within a plurality of beacon slots in a beacon period of a superframe.

10. The system of claim 1, wherein the first beaconing device is further adapted to receive a beacon from the secondary wireless system.

11. A method of wireless communication, the method comprising:
   providing a first beaconing device associated with a first primary wireless system that is adapted to communicate over a first range, the first beaconing device being adapted to communicate over at least at a second range, wherein the second range is greater than the first range, listening for beacons from other beaconing devices associated with other primary wireless systems on a plurality of channels over which the other primary systems may operate; and after listening for beacons from the other beaconing devices associated with other primary wireless systems, transmitting a first beacon to a wireless device of a secondary wireless system, wherein the first beacon includes data indicating an occupation of a first one of the channels by the first primary wireless system, data indicating a power level of a signal transmitted by the first primary wireless system, and data indicating a location of the first primary wireless system.

12. The method of claim 11, wherein the secondary wireless system communicates over the second range.

13. The system of claim 11, wherein the first beacon further includes data indicating a time during which the first beacon further occupies the first channel.

14. The method of claim 11, wherein the first beacon further includes data indicating an occupation of a second one of the channels by a second primary wireless system.

15. The method of claim 14, wherein the first beacon further includes data indicating a power level of a signal transmitted by the second primary wireless system, and data indicating a location of one of the second primary wireless system.

16. The method of claim 11, further comprising the first beaconing device communicates with a second beaconing device associated with the second primary wireless system.

17. The method of claim 11, wherein the first beaconing device transmits the first beacon within the first channel.

18. The method of claim 11, wherein the first beaconing device transmits the first beacon within a beacon slot in a beacon period of a superframe.

19. The method of claim 11, wherein the first beaconing device transmits the first beacon within a plurality of beacon slots in a beacon period of a superframe.

20. The method of claim 11, further comprising receiving at the first beaconing device a beacon from the secondary wireless system.

* * * * *